United States Patent
Aida et al.

(10) Patent No.: US 10,684,952 B2
(45) Date of Patent: Jun. 16, 2020

(54) DISK DEVICE AND DISK DEVICE CONTROL METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventors: Kimiyasu Aida, Kawasaki Kanagawa (JP); Hidekazu Masuyama, Kawasaki Kanagawa (JP); Katsushi Ohta, Kawasaki Kanagawa (JP); Hirotaka Iima, Yokohama Kanagawa (JP); Takumi Kakuya, Ebina Kanagawa (JP); Takato Kuji, Yokohama Kanagawa (JP); Yuji Karakawa, Yokohama Kanagawa (JP); Kenji Inoue, Kamakura Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/118,821

(22) Filed: Aug. 31, 2018

(65) Prior Publication Data
US 2019/0286565 A1 Sep. 19, 2019

(30) Foreign Application Priority Data
Mar. 19, 2018 (JP) .................... 2018-051553

(51) Int. Cl.
*G06F 12/0868* (2016.01)
*G11B 19/28* (2006.01)

(52) U.S. Cl.
CPC ......... *G06F 12/0868* (2013.01); *G11B 19/28* (2013.01); *G06F 2212/1024* (2013.01); *G06F 2212/21* (2013.01); *G06F 2212/281* (2013.01); *G06F 2212/313* (2013.01)

(58) Field of Classification Search
CPC ............................ G06F 12/0868; G11B 19/28
See application file for complete search history.

(56) References Cited

U.S. PATENT DOCUMENTS

| | | | |
|---|---|---|---|
| 7,143,203 B1 | 11/2006 | Altmejd | |
| 8,630,056 B1* | 1/2014 | Ong | G11B 19/2054 360/55 |
| 9,696,929 B2 | 7/2017 | Muroyama et al. | |
| 9,740,272 B2 | 8/2017 | Fang et al. | |
| 2012/0042182 A1 | 2/2012 | Fulkerson et al. | |
| 2018/0018269 A1* | 1/2018 | Jannyavula Venkata | G06F 12/0888 |

FOREIGN PATENT DOCUMENTS

JP 2016-133847 A 7/2016

* cited by examiner

*Primary Examiner* — Edward J Dudek, Jr.
(74) *Attorney, Agent, or Firm* — White & Case LLP

(57) ABSTRACT

According to one embodiment, a disk medium rotates in a first rotation state when access is given, and rotates in a second rotation state lower in rotation number than the first rotation state when access is not given. A controller receives, from a host device, a read command for reading first data stored in a first buffer, when the disk medium is in the second rotation state. The controller transmits the first data from the first buffer to the host device, without causing a shift into the first rotation state, and then shifts the disk medium into the first rotation state after completion of execution of the read command.

16 Claims, 8 Drawing Sheets

DISK DEVICE AND DISK DEVICE CONTROL METHOD

CROSS-REFERENCE TO RELATED APPLICATIONS

This application is based upon and claims the benefit of priority from Japanese Patent Application No. 2018-051553, filed on Mar. 19, 2018; the entire contents of which are incorporated herein by reference.

FIELD

An embodiment described herein relates generally to a disk device and a disk device control method.

BACKGROUND

Conventional disk devices are provided with power states, which include an active mode for performing processing in accordance with commands, and a power saving mode for reducing power consumption, without performing any processing, as compared with the active mode. For example, when the continuation time of no processing being performed reaches a certain set value in the active mode, the active mode is shifted to the power saving mode. However, in the case of conventional disk devices, when receiving a command, in the power saving mode, from, for example, an external device, the disk devices return a response after returning into the active mode, and thus take a long time for the response.

DETAILED DESCRIPTION

In general, according to one embodiment, a disk device includes a first buffer, a disk medium, and a controller. The first buffer stores data stored on a basis of history information concerning read access. The disk medium rotates in a first rotation state when access is given, and rotates in a second rotation state lower in rotation number than the first rotation state when access is not given. The controller controls data transfer between the first buffer and the disk medium. The controller receives, from a host device, a read command for reading first data stored in the first buffer, when the disk medium is in the second rotation state. The controller transmits the first data from the first buffer to the host device, without causing a shift into the first rotation state, and then shifts the disk medium into the first rotation state after completion of execution of the read command.

An exemplary embodiment of a disk device will be explained below in detail with reference to the accompanying drawings. The present invention is not limited to the following embodiment.

Figure 1:
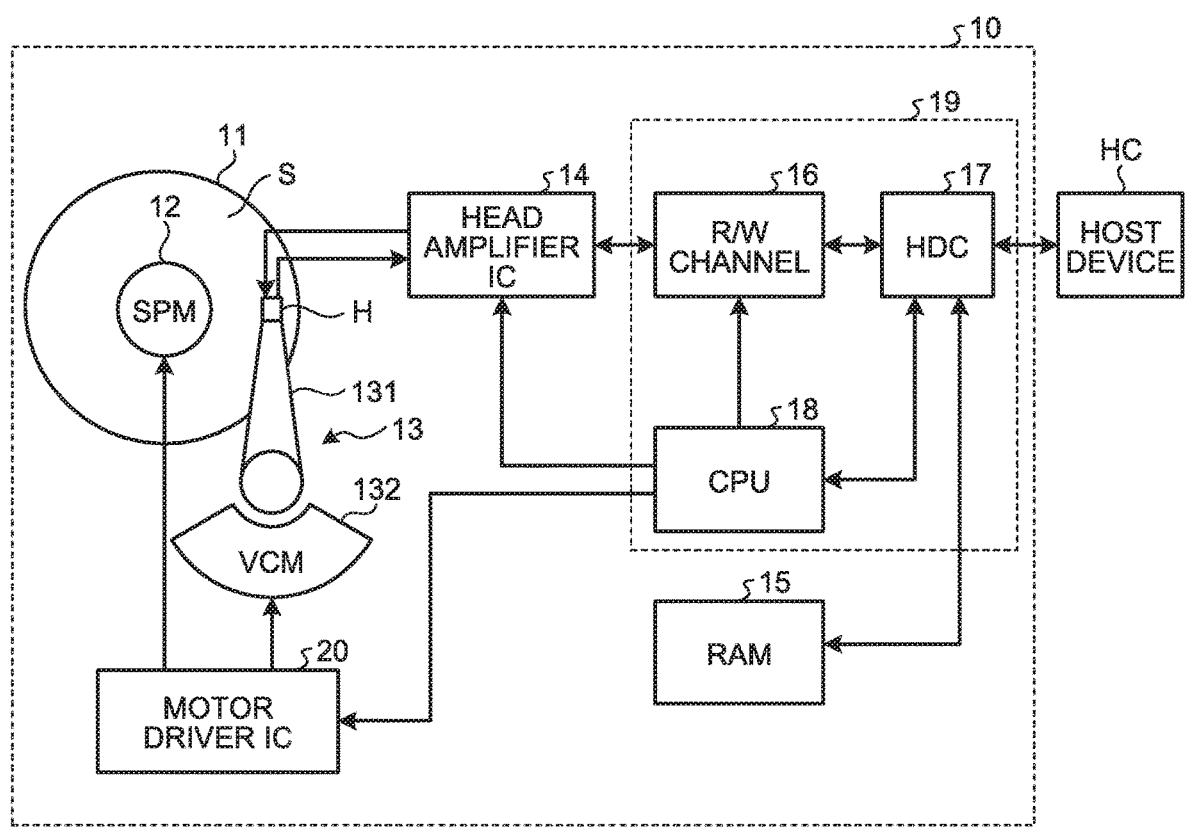
FIG. 1 is a block diagram schematically illustrating a schematic configuration example of a disk device according to an embodiment.

FIG. 1 is a block diagram schematically illustrating a schematic configuration example of a disk device according to an embodiment. The disk device may be exemplified by a Hard Disk Drive (HDD).

The disk device 10 includes a disk 11, a spindle motor 12, a Head Stack Assembly (which will be referred to as "HSA", hereinafter) 13, a head amplifier integrated circuit (which will be referred to as "head amplifier IC", hereinafter) 14, a Random Access Memory (which will be referred to as "RAM", hereinafter) 15, a read/write channel (which will be referred to as "R/W channel", hereinafter) 16, a Hard Disk Controller (which will be referred to as "HDC", hereinafter) 17, a Central Processing Unit (which will be referred to as "CPU", hereinafter) 18 serving as an example of a processor, and a motor driver IC 20.

The disk 11 is a disk medium that includes recording surfaces S for recording data thereon and is driven for rotation by the spindle motor 12. The disk device 10 is equipped with a plurality of disk media 11. Further, every recording surface S included in the disk device 10 is given physical addresses set as positional information indicating physical positions on the recording surface S. The physical addresses are allocated in units of a sector, for example. The spindle motor 12 is driven by electric current (or voltage) supplied from the motor driver IC 20.

The HSA 13 includes a head H, a head suspension 131, and a Voice Coil Motor (which will be referred to as "VCM", hereinafter) 132. The head H is provided for every recording surface S of the disk 11. The head H includes a write head used for writing data into the disk 11, and a read head used for reading data from the disk 11.

The head suspension 131 is provided for every head H, and supports the head H. The VCM 132 is driven by electric current (or voltage) supplied from the motor driver IC 20. The head suspension 131 and the VCM 132 constitute an actuator. The actuator performs control by using drive of the VCM 132 to move the head H supported by the head suspension 131 to a predetermined position on the recording surface S of the disk 11. With this arrangement of the HSA 13, the head H can move in a radial direction of the recording surface S of the disk 11.

The head amplifier IC 14 causes a write signal (electric current), which corresponds to write data input from the R/W channel 16, to flow to the head H. Further, the head amplifier 14 amplifies a read signal output from the head H (read data read from the disk 11 by the head H), and transmits the read signal to the R/W channel 16.

The RAM 15 is used as temporary storage areas, and is formed of a volatile memory, such as a Dynamic RAM (DRAM) or Static RAM (SRAM). The areas formed in the RAM 15 include an area for buffering access object data in processing of access from a host device HC, an area for storing management information to be used for controlling the disk device 10, an area to be used in obtaining history information as described later, and so forth.

The R/W channel 16 is a signal processing circuit. The R/W channel 16 performs encoding (code modulation) to write data input from the HDC 17, and outputs the write data to the head amplifier IC 14. Further, the R/W channel 16 performs decoding (code demodulation) to read signal transmitted from the head amplifier IC 14 into read data, and outputs the read data to the HDC 17.

The HDC 17 serves as a communication interface that enables communication with the host device HC. Specifically, upon reception of a write command from the host device HC, the HDC 17 stores the write data into a buffer 151 of the RAM 15, and returns a response to the host device HC after completion of the write processing. Further, upon reception of a read command from the host device HC, the HDC 17 returns read data stored in the buffer 151 by the read processing, to the host device HC.

In this embodiment, the HDC 17 monitors access states to the disk device 10, and sets the disk device 10 on the basis of the monitored result and information obtained by performing statistical processing to the monitored result. This processing will be described later in detail.

The CPU 18 serves as the main controller of the disk device 10, and executes various kinds of processing, such as control processing over the head H in writing of write data and reading of read data, and servo control processing for controlling the position of the head H on the recording surface S of the disk 11. Here, the CPU 18 executes these various kinds of processing by using programs stored in nonvolatile storage media, such as a Read Only Memory (ROM) (not illustrated) and the disk 11.

Further, the CPU 18 controls the power state of the disk device 10. In this embodiment, the disk device 10 is assumed to be shifted between an active mode and a power saving mode. The active mode is a mode for executing processing in accordance with commands from the host device HC, and is shifted to the power saving mode when a state of receiving no command from the host device HC continues for a predetermined time in the active mode. The power saving mode is a state where, for example, the rotation number of the disk 11 is set lower as compared with active mode. Whether to cause a shift from the active mode to the power saving mode is determined in accordance with setting. When a shift into the power saving mode is to be used, a continuation time of the state of receiving no command from the host device HC is set. The continuation time is clocked by a timer, for the CPU 18 to cause a shift into the power saving mode.

The motor driver IC 20 supplies electric current or voltage to the spindle motor 12, and thereby drives the spindle motor 12 at a predetermined rotational speed. Further, the motor driver IC 20 supplies electric current or voltage specified by the CPU 18 to the VCM 132, and thereby drives the actuator.

For example, the R/W channel 16, the HDC 17, and the CPU 18 are incorporated in an integrated circuit 19 called "System on Chip (SoC)", which is integrated in one chip. This integrated circuit 19 serves as a controller in a broad sense.

Figure 2:
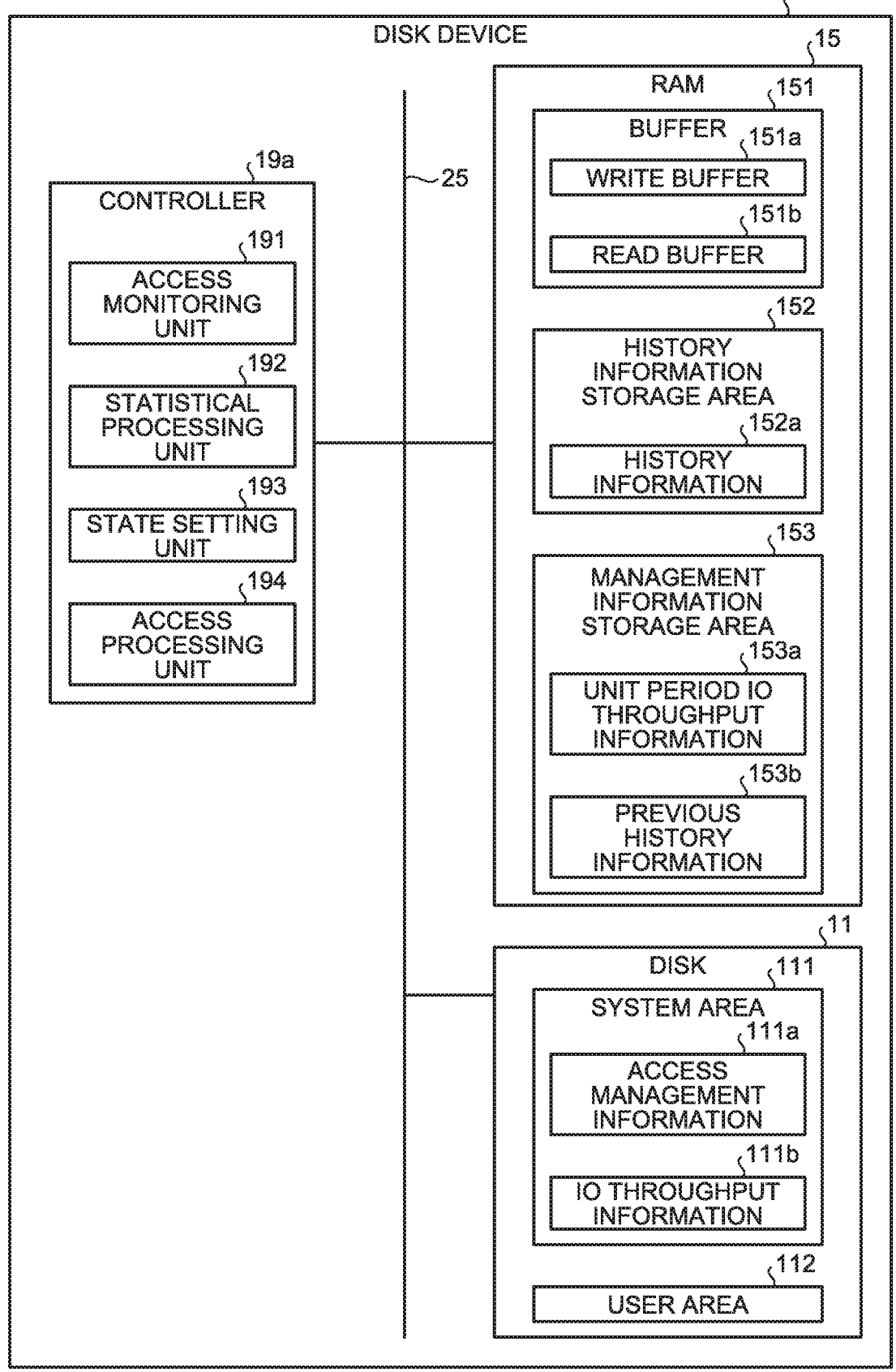
FIG. 2 is a block diagram schematically illustrating a functional configuration example of the disk device according to the embodiment.

Next, FIG. 2 is a block diagram schematically illustrating a functional configuration example of the disk device according to the embodiment. Here, FIG. 2 illustrates only a functional processing part relevant to this embodiment. In the disk device 10, the RAM 15, the disk 11, and a controller 19a are connected to each other via a bus line 25. Here, the controller 19a is composed of the R/W channel 16, the HDC 17, and the CPU 18.

In the RAM 15, a buffer 151, a history information storage area 152, and a management information storage area 153 are arranged. The buffer 151 includes a write buffer 151a and a read buffer 151b. The write buffer 151a temporarily stores data to be written into the disk 11 in accordance with a command instructing writing (which will be referred to as "write command", hereinafter) of write data into the disk 11. The read buffer 151b temporarily stores data read from the disk 11 in accordance with a command instructing reading (which will be referred to as "read command", hereinafter) of read data from the disk 11.

Here, the write command includes a start Logical Block Address (which will be referred to as "LBA", hereinafter) representing logical sectors that serve as the write destination of write data, among the logical sectors (blocks) managed on the disk 11, and a write data length. On the other hand, the read command includes a start LBA representing logical sectors that store read data to be read, among the logical sectors managed on the disk 11.

Figure 3:
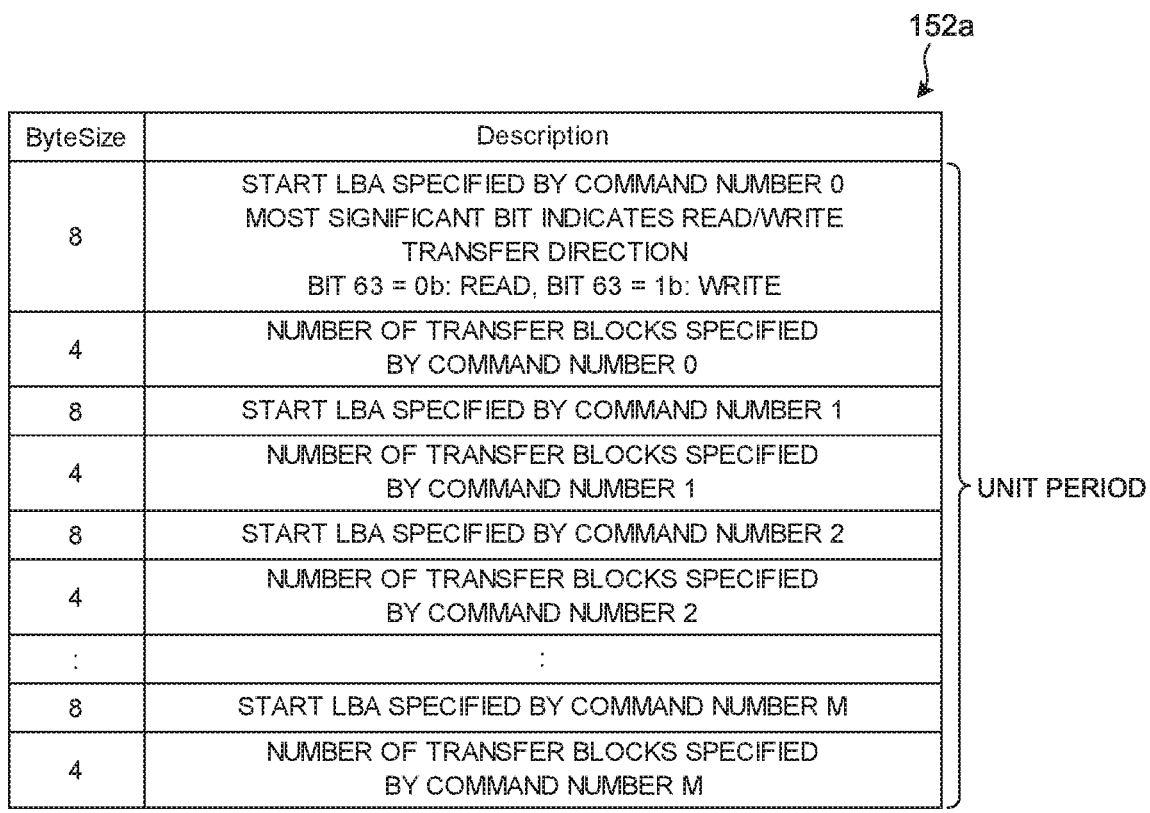
FIG. 3 is a diagram illustrating an example of history information according to the embodiment.

The history information storage area 152 stores history information 152a about access states during a predetermined collection period (which will be referred to as "unit period", hereinafter) in the disk device 10. FIG. 3 is a diagram illustrating an example of the history information according to the embodiment. The history information 152a contains an access destination start LBA and a transfer amount for each one of write access and read access during a unit period. As the transfer amount, the number of transfer blocks or the number of transfer bits may be used. However, when the number of transfer bits is used, the storage volume of the transfer amount becomes larger; therefore, the number of transfer blocks, which can reduce the storage volume, is preferably used. In the following example, a case will be explained where the number of transfer blocks is used. In the example of FIG. 3, every access state in a unit period is stored by using a set of a start LBA of eight bytes and the number of transfer blocks of four bytes. The most significant bit (63rd bit) of the start LBA indicates whether this is about reading or writing. For example, at the 63rd bit, "0" represents reading and "1" represents writing. Although this will be described later in detail, the unit period used here is one hour, for example.

The management information storage area 153 stores management information necessary for controlling the disk device 10. In this embodiment, the management information contains unit period input-output (which will be referred to as "IO", hereinafter) throughput information 153a and previous history information 153b. The unit period IO throughput information 153a is information indicating a summary of access states in a past unit period, and will be described later in detail. The previous history information 153b is history information 152a in the past unit period, which is information to be used for estimating access to the disk device 10 in the unit period including the present moment.

On the disk 11, a system area 111 and a user area 112 are formed. The system area 111 stores system information to be used for controlling the disk device 10. The system information contains, for example, access management information 111a and IO throughput information 111b. The user area 112 is an area for storing data or the like to be written in accordance with an instruction from the host device HC.

The access management information 111a is information that saves that part of the history information 152a stored in the history information storage area 152 of the RAM 15, which corresponds to a predetermined measurement object period. Although this will be described later in detail, the measurement object period is formed by collecting a plurality of unit periods. For example, when the measurement object period is one day and the unit period is one hour, portions of the history information 152a corresponding to 24 hours are collected to form the access management information 111a. The content of the access management information 111a is formed such that the content illustrated in FIG. 3 is correlated with identification information indicating each unit period.

Figures 4, 5:
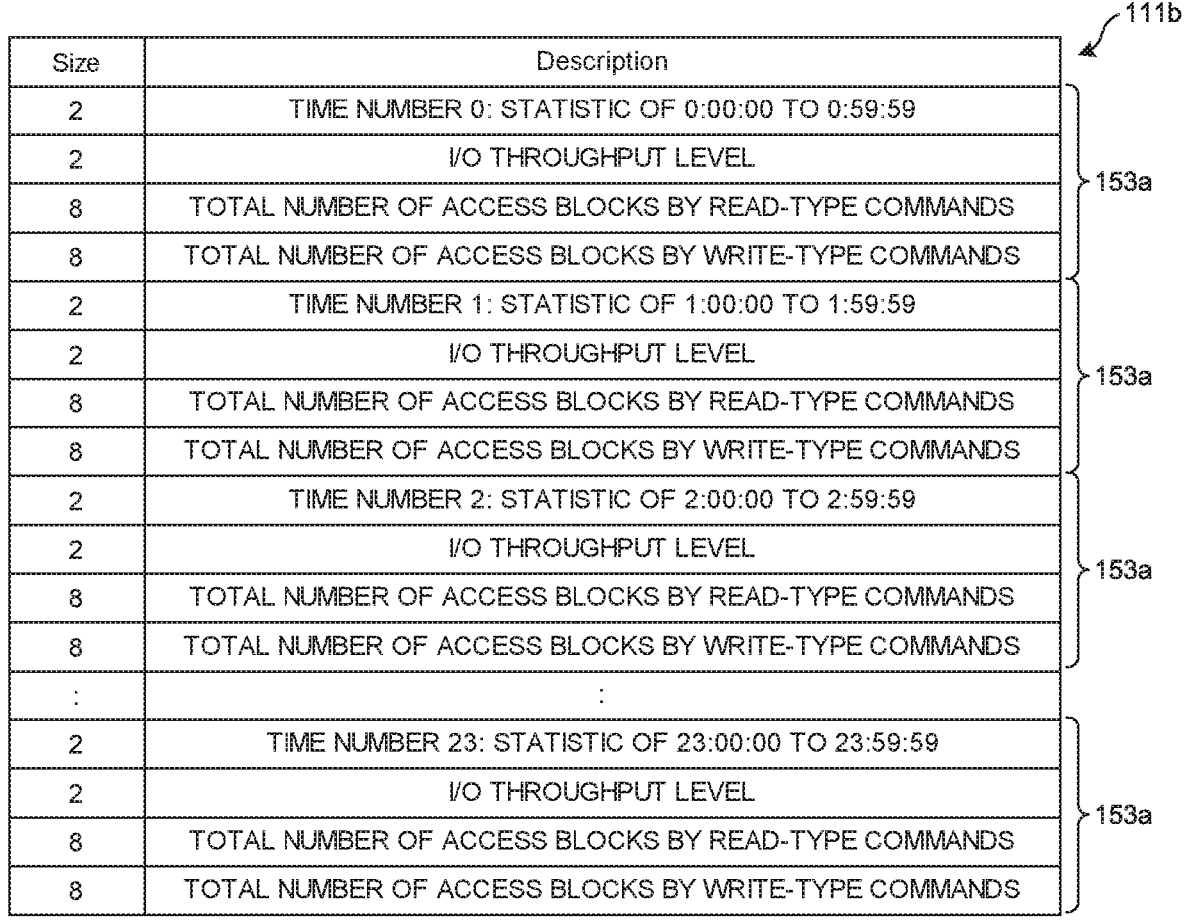
FIG. 4 is a diagram illustrating an example of IO throughput information according to the embodiment.
FIG. 5 is a diagram illustrating an example of a set value of rotations per minute [rpm] in accordance with an I/O throughput level according to the embodiment.

The IO throughput information 111b is information that saves that part of the unit period IO throughput information 153a generated by statistical processing from the history information 152a stored in the history information storage area 152, which corresponds to the measurement object period. FIG. 4 is a diagram illustrating an example of the IO throughput information according to the embodiment. The IO throughput information 111b contains identification information for identifying each unit period in the measurement object period; and an I/O throughput level, the total number of access blocks by read-type commands, and the total number of access blocks by write-type commands, in each unit period identified by the identification information. The I/O throughput level is obtained by the following formula (1).

$$\text{I/O throughput level} = (\text{"data transfer amount"}/\text{"data buffer capacity" in unit period}) \times 100 [\%] \quad (1)$$

When the formula (1) gives a value lower than 100%, i.e., when the data transfer amount is smaller than the data buffer capacity, it is determined that the I/O throughput level indicates a non-busy period. When the formula (1) gives a value equal to or higher than 100%, i.e., when the data transfer amount is equal to or larger than the data buffer capacity, it is determined that the I/O throughput level indicates a busy period. The total number of access blocks by read-type commands is the sum of the numbers of transfer blocks by the read-type commands in the history information 152a of a unit period. The total number of access blocks by write-type commands is the sum of the numbers of transfer blocks by the write-type commands in the history information 152a of a unit period.

In FIG. 4, the unit period IO throughput information 153a is composed of the I/O throughput level, the total number of access blocks by read-type commands, and the total number of access blocks by write-type commands, in each unit period. Accordingly, the IO throughput information 111b contains the unit period IO throughput information 153a of every unit period in the measurement object period.

The controller 19a includes an access monitoring unit 191, a statistical processing unit 192, a state setting unit 193, and an access processing unit 194.

The access monitoring unit 191 monitors commands from the host device HC. Upon reception of a command from the host device HC, the access monitoring unit 191 acquires information concerning the access destination from the command, and stores its content into the history information 152a in the history information storage area 152. Specifically, upon reception of a command from the host device HC, the access monitoring unit 191 judges whether the command is a read command or write command. When the command is a read command, the access monitoring unit 191 acquires the start LBA and the read data length in the read command, and stores them into the history information 152a. When the command is a write command, the access monitoring unit 191 acquires the start LBA and the write data length in the write command, and stores them into the history information 152a.

When a unit period ends, the access monitoring unit 191 saves the history information 152a in the history information storage area 152, together with identification information for identifying each unit period, into the access management information 111a in the system area 111. FIG. 3 can also be said as illustrating an example of the access management information 111a saved by the access monitoring unit 191. Here, an explanation will be given of the unit period and the measurement object period. The measurement object period and the unit period can be set arbitrarily. For example, when the access to the disk device 10 has periodicity, the measurement object period may be set in accordance with this periodicity. Further, the unit period may be set to match with the tendency of access frequency during the measurement object period. For example, when the state of access given at the same time of every day seems similar, the measurement object period is set to one day, and the unit period is set to a period of every one hour starting from 0 o'clock 00 minutes 00 seconds of this one day. The following explanation will be exemplified by the case where the unit period is set by one hour starting from 00 minutes 00 seconds; however, the embodiment is not limited to this. For example, the unit period may be set to 30 minutes, or may be set to another time length. Further, when the state of access given at the same time of the same day of every week seems similar, the measurement object period may be set to one week starting from 0 o'clock 00 minutes 00 seconds of Sunday until 23 o'clock 59 minutes 59 seconds of the next Saturday, while the unit period is set to one hour.

When a unit period ends, the statistical processing unit 192 generates unit period IO throughput information 153a from the history information 152a in the history information storage area 152. Further, the statistical processing unit 192 attaches, to this information, identification information for identifying each unit period, and saves the resultant information into the IO throughput information 111b in the system area 111. Here, the statistical processing unit 192 extracts the numbers of transfer blocks by read-type commands from the history information 152a, and calculates the sum of the numbers. The statistical processing unit 192 extracts the numbers of transfer blocks by write-type commands from the history information 152a, and calculates the sum of the numbers. Then, the statistical processing unit 192 adds up the sum of the numbers of transfer blocks by read-type commands to the sum of the numbers of transfer blocks by write-type commands, and thereby calculates the total sum of the numbers of transfer blocks. Further, the statistical processing unit 192 calculates an I/O throughput level by using the formula (1), from the total sum of the numbers of transfer blocks thus calculated and the capacity of the buffer 151. The statistical processing unit 192 saves the sum of the numbers of transfer blocks by read-type commands, the sum of the numbers of transfer blocks by write-type commands, and the I/O throughput level, which have been thus calculated, to the corresponding unit period storing position of the IO throughput information 111b in the system area 111. In saving, when data previously saved has already written, overwrite saving is performed.

The state setting unit 193 determines whether the IO throughput information 111b in the system area 111 contains the unit period IO throughput information 153a of that unit period of the previous measurement object period, which corresponds to the current time, (which will be referred to as "previous unit period", hereinafter). When the unit period IO throughput information 153a is present, the state setting unit 193 reads the unit period IO throughput information 153a of the previous unit period from the disk 11, and develops this information on the management information storage area 153. The state setting unit 193 reads the I/O throughput level from the unit period IO throughput information 153a in the management information storage area 153, and sets the operation mode of the disk device 10 in accordance with the I/O throughput level.

When the I/O throughput level is equal to or higher than 100% and thus indicates a busy period, the state setting unit 193 sets the state of the disk device 10 in the active mode. In the active mode, since the disk 11 is rotated at a steady rotation number, the state setting unit 193 sets the rotation number of the disk 11 to be the steady rotation number.

When the I/O throughput level is lower than 100% and thus indicates a non-busy period, the state setting unit 193 sets the state of the disk device 10 in the power saving mode, and makes a preparation to deal with access from the host device HC by using the history information of the previous unit period, i.e., the previous history information 153b, as estimation information. Here, the history information of the previous unit period is used to estimate access from the host device HC in the unit period at the present moment (which will be referred to as "present unit period", hereinafter). Here, processing is performed on the following assumption: For a read command, access to an access destination in the previous unit period is made also in the present unit period. For a write command, the total number of access blocks in the previous unit period is almost equal to the total number of access blocks in the present unit period.

Specifically, the state setting unit 193 reads the history information of the previous unit period, which corresponds to the current time, from the access management information 111a in the system area 111, and loads this information into the management information storage area 153. Then, for every read command in the previous history information 153b thus loaded, the state setting unit 193 reads data from the user area 112 of the disk 11 specified by the start LBA and the read data length in the read command, and stores the data into the buffer 151. An area including the area with this data thus stored serves as the read buffer 151b. Further, the state setting unit 193 reads the total number of access blocks by write-type commands in the unit period IO throughput information 153a, and reserves a capacity corresponding to the total number of access blocks in the buffer 151. An area including this reserved area serves as the write buffer 151a. Here, since the I/O throughput level is lower than 100%, the sum of the total amount of data read and the reserved capacity is small than the capacity allocated to the buffer 151.

Further, the state setting unit 193 sets the rotation number of the disk 11 to be a rotation number lower than the steady rotation number. At this time, the state setting unit 193 may vary the rotation number of the disk 11 depending on the value of the I/O throughput level. FIG. 5 is a diagram illustrating an example of a set value of the rotations per minute [rpm] in accordance with the I/O throughput level according to the embodiment. Here, FIG. 5 is exemplified by a case where a steady rotation number (7,200 rpm) is to be used when the I/O throughput level is equal to or higher than 100%. As the I/O throughput level is lower, the rotations per minute [rpm] is also lower, and becomes 4,000 rpm when the I/O throughput level is 0%. However, the rotation number is regulated not to cause a command time-out to be detected by the host device HC, when the disk device is shifted into the active mode and returns a response, in response to reception of a command from the host device HC.

As the rotation number of the disk 11 is changed in accordance with the I/O throughput level, the power consumption in the power saving mode can be further suppressed, depending on the access frequency, when the I/O throughput level is lower than 100% and thus indicates a non-busy period. Where the rotations per minute [rpm] is changed in accordance with the I/O throughput level in this way, the information of FIG. 5 is stored in the management information storage area 153, for example. Here, the information of FIG. 5 may be in any form of information, as long as the I/O throughput level and the rotation number of the disk 11 are correlated with each other. On the other hand, when the unit period IO throughput information 153a of the previous unit period is not present in the IO throughput information 111b in the system area 111, the state setting unit 193 does not perform state setting based on the estimation data (history information).

In the case of the active mode, the access processing unit 194 performs processing in accordance with a command received from the host device HC. For example, upon reception of a read command, the access processing unit 194 reads data having a specified read data length from a specified start LBA, and returns the data to the host device HC. Further, upon reception of a write command, the access processing unit 194 writes data having a specified data length from a specified start LBA.

In the case of the power saving mode, the access processing unit 194 executes command processing without causing a shift into the active mode as far as possible, and then causes a shift into the active mode after transmitting a completion signal to the host device HC. For example, as the read buffer 151b and the write buffer 151a have been prepared by the state setting unit 193 as described above, upon reception of a read command about which the access destination data is present in the read buffer 151b, or upon reception of a write command about which the write data length is within the empty capacity range of the write buffer 151a, the access processing unit 194 executes command processing without causing a shift into the active mode, and thereafter causes a shift into the active mode. On the other hand, upon reception of a command other than the read command and write command, the access processing unit 194 executes command processing without causing a shift into the active mode, and then keeps the power saving mode after transmitting a completion signal to the host device HC.

Upon reception of a read command about which the access destination data is not present in the read buffer 151b, or upon reception of a write command about which the write data length exceeds the empty capacity range of the write buffer 151a, the access processing unit 194 causes a shift into the active mode, and executes the command.

Figure 6:
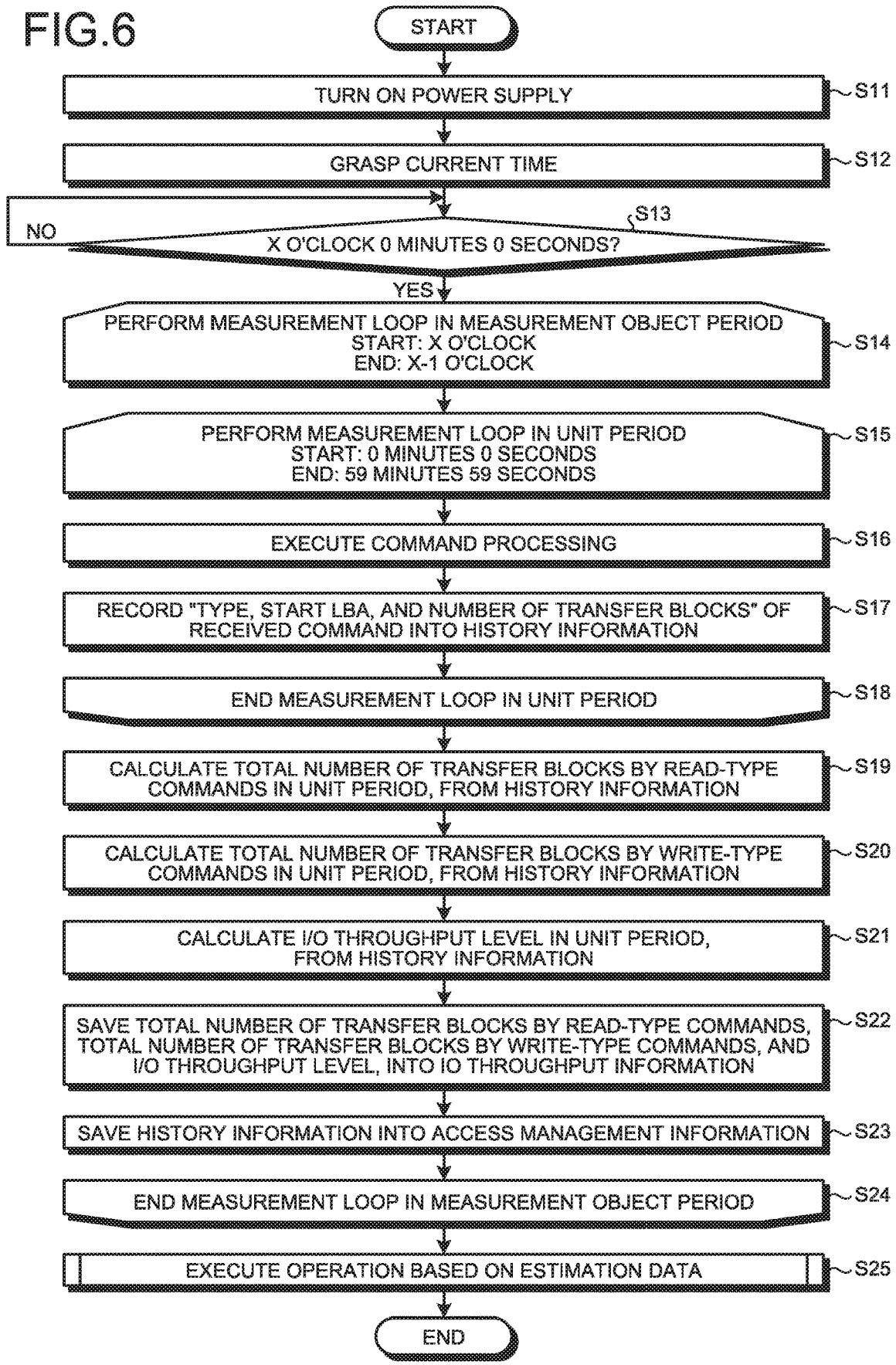
FIG. 6 is a flowchart illustrating an example of a processing sequence in startup of the disk device according to the embodiment.

Next, an explanation will be given of processing in this disk device 10. FIG. 6 is a flowchart illustrating an example of a processing sequence in startup of the disk device according to the embodiment. First, when the power supply of the disk device 10 is turned on (step S11), the controller grasps the current time (step S12). For example, notice of a UNIX (registered trademark) time is give by a Set Time Stamp command issued from the host device HC to the disk device 10, and enables the disk device 10 to grasp the current time.

Then, the controller determines whether the current time is X o'clock 0 minutes 0 seconds (step S13). When the current time is not X o'clock 0 minutes 0 seconds (No at step S13), a waiting state follows. When the current time is X o'clock 0 minutes 0 seconds (Yes at step S13), measurement loop processing in a measurement object period follows (step S14). This measurement loop processing in a measurement object period starts processing at X o'clock, and ends processing at X−1 o'clock. Here, X is an integer of 0 to 23. It is assumed that, when X o'clock is 0 o'clock, X−1 o'clock is 23 o'clock. Accordingly, in this example, the measurement loop processing in a measurement object period uses one day as the measurement object period.

Thereafter, measurement loop processing in a unit period follows (step S15). This measurement loop processing in a unit period starts processing at 0 minutes 0 seconds, and ends processing at 59 minutes 59 seconds. Accordingly, in this example, the measurement loop processing in a unit period uses one hour as the unit period. Then, upon reception of a command from the host device HC, the access processing unit 194 executes processing based on the command (step S16), and the access monitoring unit 191 records the type, the start LBA, and the number of transfer blocks, of the command thus received, into the history information 152a in the history information storage area 152 (step S17). The access monitoring unit 191 determines whether the time instant has reached 59 minutes 59 seconds (step S18). The processing of steps S16 to S17 is executed until the time instant reaches 59 minutes 59 seconds.

When the time instant has reached 59 minutes 59 seconds, the statistical processing unit 192 calculates the total number of transfer blocks by read-type commands in the unit period, the total number of transfer blocks by write-type commands in the unit period, and the I/O throughput level in the unit period, from the history information 152a acquired by the unit period measurement loop of steps S15 to S18 (steps S19 to S21). Thereafter, the statistical processing unit 192 saves the total number of transfer blocks by read-type commands, the total number of transfer blocks by write-type commands, and the I/O throughput level, which have been thus calculated, into the IO throughput information 111b in the system area 111, in a state correlated with the unit period (step S22). Further, the access monitoring unit 191 saves the history information 152a into the access management information 111a in the system area 111, in a state correlated with the unit period (step S23).

Thereafter, the access monitoring unit 191 determines whether the end time has come (X−1 o'clock, in this example) (step S24). When the end time has not yet come, the processing from steps S14 to S24 is executed again for the next unit period in the measurement object period (X+1 o'clock, in this example).

On the other hand, when the end time has come, the controller executes operation processing based on estimation data (step S25). As a result, the processing sequence ends.

Figure 7:
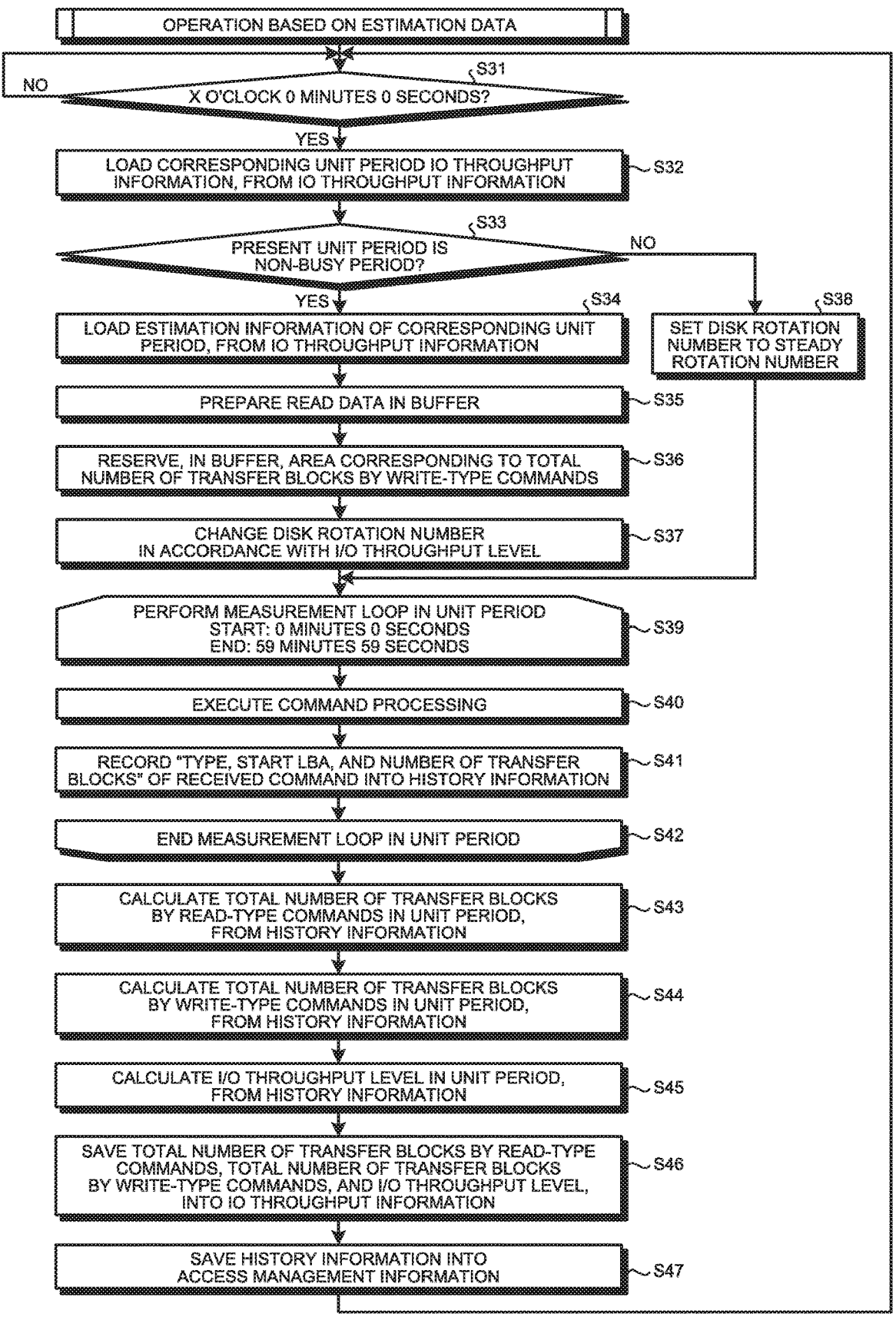
FIG. 7 is a flowchart illustrating an example of the sequence of operation processing based on estimation data.

FIG. 7 is a flowchart illustrating an example of the sequence of the operation processing based on estimation data. In this processing, the controller determines whether the current time has reached X o'clock 0 minutes 0 seconds (step S31). When X o'clock 0 minutes 0 seconds has not yet come (No at step S31), a waiting state follows. When X o'clock 0 minutes 0 seconds has come (Yes at step S31), the state setting unit 193 loads the unit period IO throughput information 153a of the previous unit period, from the IO throughput information 111b in the system area 111, into the management information storage area 153 (step S32).

The state setting unit 193 determines whether the present unit period is a non-busy period, on the basis of the unit period IO throughput information 153a of the previous unit period (step S33). Here, the state setting unit 193 uses the I/O throughput level of that unit period of the measurement object period previous by one period, which corresponds to the current time, (i.e., the previous unit period), as the I/O throughput level of the present unit period. Thus, the state setting unit 193 reads the I/O throughput level of the unit period IO throughput information 153a, and determines whether the I/O throughput level is lower than 100%.

When the present unit period is a non-busy period (Yes at step S33), the state setting unit 193 loads the history information of the previous unit period corresponding to the current time, from the access management information 111a in the system area 111, into the management information storage area 153, as the previous history information 153b (step S34). Here, for a read command, it is estimated that data read in the previous unit period is to be read. On the other hand, for a write command, it is estimated that data is to be written in an amount the same as that of data written in the previous unit period. Specifically, with reference to the previous history information 153b, the state setting unit 193 reads data having a read data length from a start LBA, as indicated by a read command, from the user area 112, and writes the data into the buffer 151. This operation is performed to every read command in the history information 152a, so that read data is prepared in the read buffer 151b (step S35). Further, with reference to the previous history information 153b or unit period IO throughput information 153a, the state setting unit 193 reserves, in the write buffer 151a, an area corresponding to the total number of transfer blocks by write-type commands (step S36). Further, the state setting unit 193 changes the rotation number of the disk 11 in accordance with the I/O throughput level (step S37). For example, with reference to the rotations per minute [rpm] information illustrated in FIG. 5 that correlates the I/O throughput level and the rotations per minute [rpm] with each other, the state setting unit 193 sets the rotations per minute [rpm] to correspond to the I/O throughput level. In this way, when a non-busy period is estimated to come, the state setting unit 193 performs setting for the disk device 10 to be in the power saving mode.

On the other hand, when the present unit period is not a non-busy period in step S33 (No at step S33), i.e., when the I/O throughput level is equal to or higher than 100%, the state setting unit 193 sets the rotation number of the disk 11 to be the steady rotation number (step S38). Thus, when a busy period is estimated to come, the state setting unit 193 performs setting for the disk device 10 to be in the active mode.

Thereafter or after step S37, processing similar to that of steps S15 to S24 of FIG. 6 is executed (steps S39 to S47). Then, the processing sequence returns to step S31.

It should be noted that, even when the present unit period is a non-busy period in step S33 and the timer into the power saving mode is not effective, the state may be shifted into the power saving mode to reduce the power consumption positively.

Further, when the present unit period is a non-busy period in step S33 and the timer into the power saving mode is effective, the rotation number may be reduced stepwise while the state is shifted into the power saving mode in accordance with the timer. In this case, the power consumption can be reduced positively.

Figure 8:
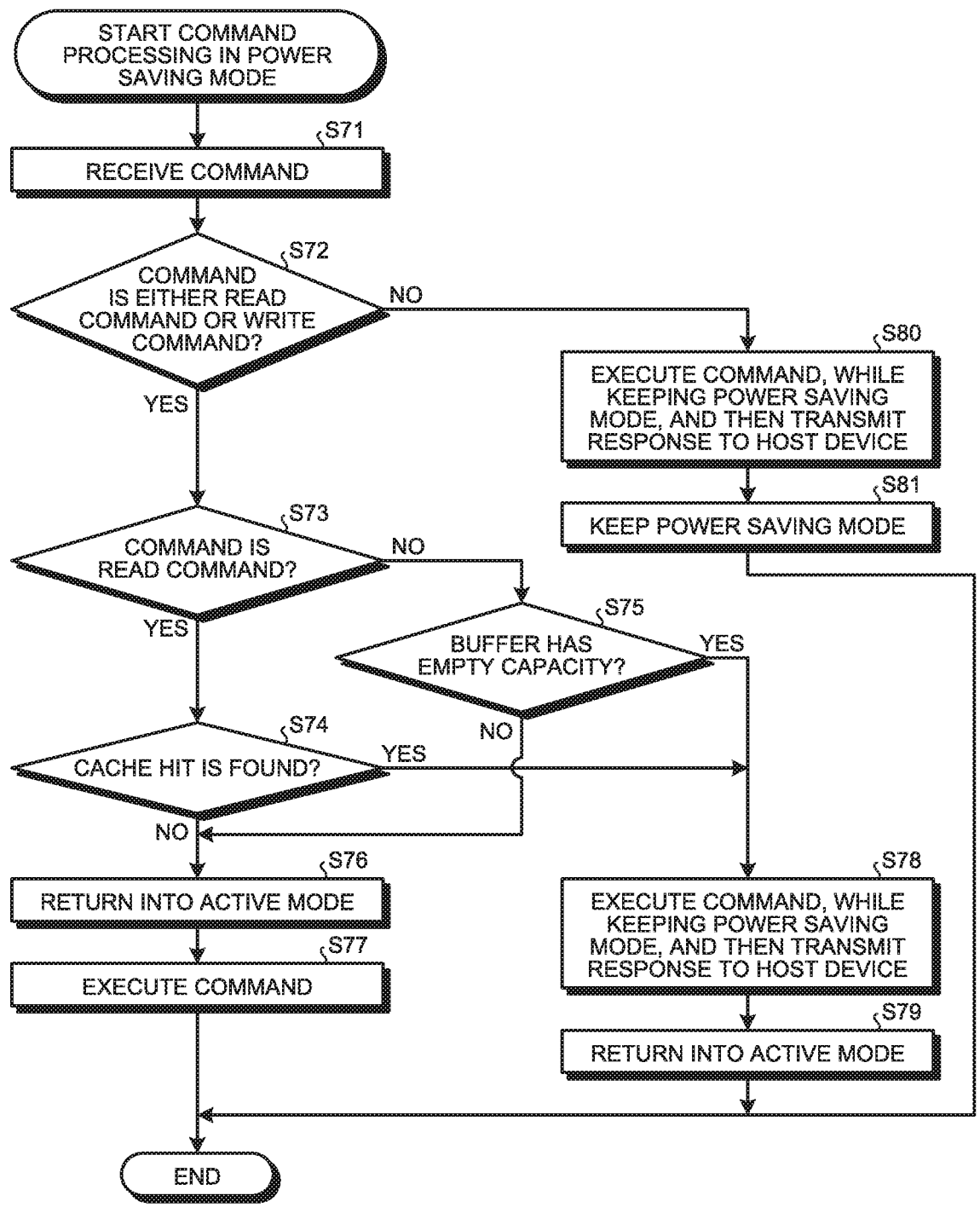
FIG. 8 is a flowchart illustrating an example of the sequence of command processing in a power saving mode according to the embodiment.

Here, an explanation will be given of command processing in step S40 in the case where the disk device 10 is set in the power saving mode by the state setting unit 193. FIG. 8 is a flowchart illustrating an example of the sequence of the command processing in the power saving mode according to the embodiment.

Upon reception of a command (step S71), the access processing unit 194 determines the type of the command.

Specifically, the access processing unit 194 determines whether the received command is either a read command or write command (step S72). When the command is either a read command or write command (Yes at step S72), the access processing unit 194 determines whether the received command is a read command (step S73).

When the command is a read command (Yes at step S73), the access processing unit 194 determines whether a cache hit is found (step S74). Specifically, the access processing unit 194 determines whether data having a read data length from a start LBA, as indicated by the read command, is stored in the buffer 151.

When a cache hit is not found (No at step S74), i.e., when the data indicated by the read command is not stored in the buffer 151, the access processing unit 194 causes the disk device 10 to return into the active mode (step S76). After the disk 11 returns into the steady rotation, the access processing unit 194 executes the command (step S77). Then, the processing sequence ends.

On the other hand, when a cache hit is found (Yes at step S74), i.e., when the data indicated by the read command is stored in the buffer 151, the access processing unit 194 executes the command, while keeping the power saving mode. After completion of the command execution, the access processing unit 194 transmits a response to the host device HC (step S78). Thereafter, the access processing unit 194 causes the disk device 10 to return into the active mode (step S79). Then, the processing sequence ends.

When the received command is not a read command in step S73 (No at step S73), i.e., when the command is a write command, the access processing unit 194 determines whether the buffer 151 has an empty capacity that can store the write data amount indicated by the write command (step S75). When the buffer 151 does not have the empty capacity (No at step S75), the processing sequence proceeds to step S76. On the other than, when the buffer 151 has the empty capacity (Yes at step S75), the processing sequence proceeds to step S78. At this time, in step S79, data stored in the buffer 151 is saved into the user area 112 of the disk 11 with predetermined timing.

Further, when the received command is neither a read command or write command in step S72 (No at step S72), i.e., when the command is a command that does not use the disk 11, such as a command with respect to the read buffer 151b or write buffer 151a, the access processing unit 194 executes the command, while keeping the power saving mode. After completion of the command execution, the access processing unit 194 transmits a response to the host device HC (step S80). Thereafter, the power saving mode is kept (step S81), and the processing sequence ends. In this way, a command is executed in the case of the power saving mode.

Here, when the estimation data indicates that the next unit period is a non-busy period and the operation of the controller 19a will be obviously small, processing for examining the recording state of medium data may be performed to improve the throughput of a busy period. The processing for examining the recording state of medium data may be exemplified by Background Medium Scan (BMS) processing or Adjacent Track Interference (ATI) prevention processing. The BMS processing is processing that sequentially scans LBAs in the whole user data, as a Background Task during an idle period, to early detect a sector that can become a defective sector in future. The ATI processing is processing that rewrites data suffering the influence of side erasing or the like caused by a data write operation on the disk 11, to repair the data and prevent data loss. In this case, it may be adopted that the BMS processing or ATI prevention processing can be performed on the premise of a non-busy period, regardless of the start time of the BMS processing or ATI prevention processing.

Further, when the estimation data indicates that the next unit period is a busy period and the operation of the controller 19a will be obviously large, the operation time of the BMS processing may be set not to overlap with the busy period, or the ATI prevention processing may be deterred except for an emergency, to improve the throughput. Further, the state shift period (interval) may be set longer than a time set in advance, to prevent a shift into a power state lower in power consumption.

Figure 9A:
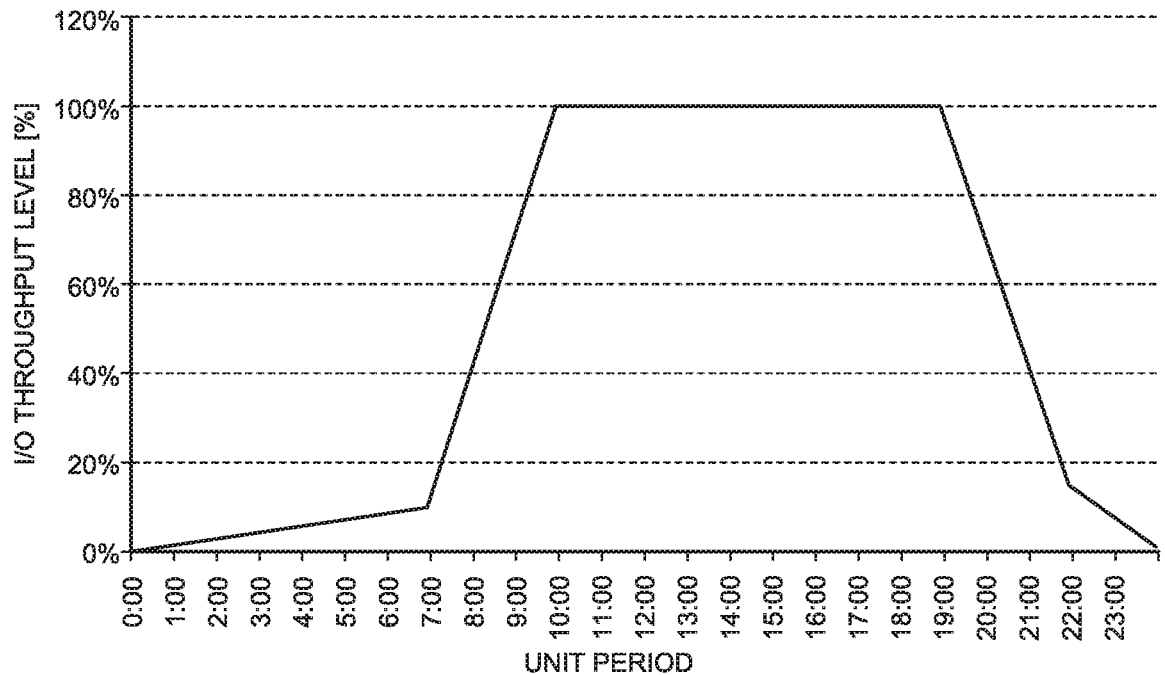
FIGS. 9A and 9B are diagrams illustrating an example of the relation between an access frequency and disk rotation in the disk device.
Figure 9B:
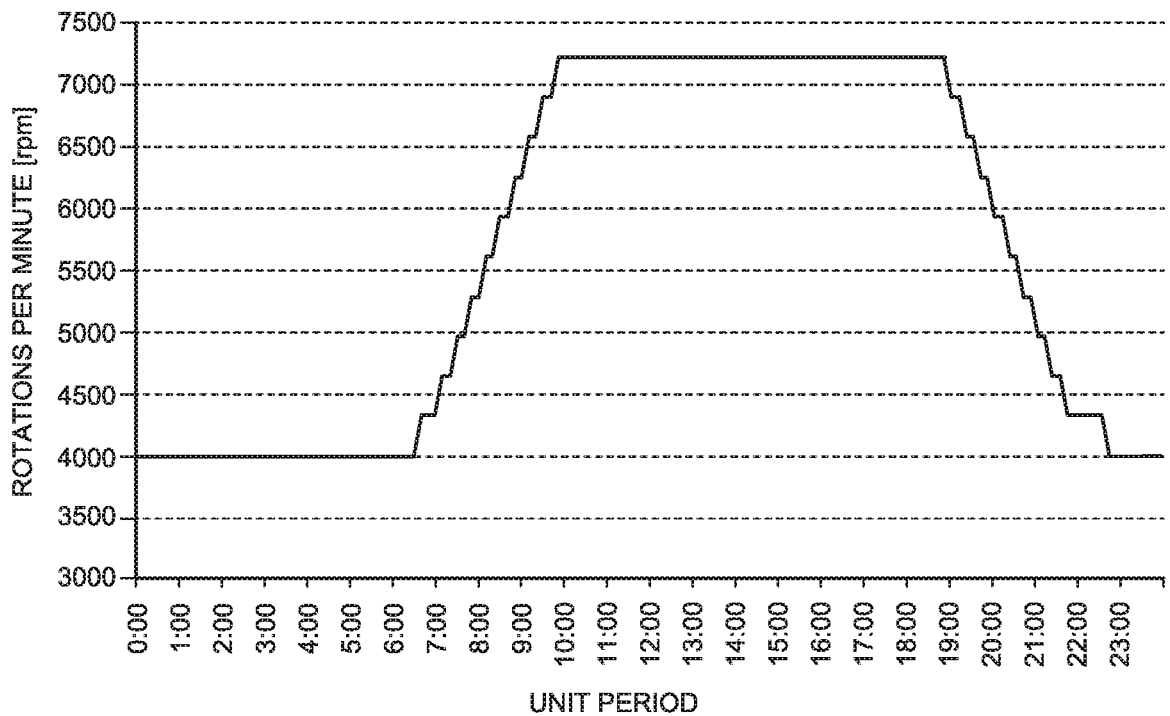

FIGS. 9A and 9B are diagrams illustrating an example of the relation between the access frequency and the disk rotation in the disk device. FIG. 9A is a diagram illustrating an example of transition of the access frequency. FIG. 9B is a diagram illustrating an example of the rotations per minute [rpm]. Here, a case is illustrated where the measurement object period is set to one day and the unit period is set to one hour. In FIG. 9A, the horizontal axis denotes the unit period (hour), and the vertical axis denotes the I/O throughput level (%). Further, when the I/O throughput level is equal to or higher than 100%, this level is represented by "100%". In FIG. 9B, the horizontal axis denotes the unit period (hour), and the vertical axis denotes the rotations per minute [rpm].

As illustrated in FIG. 9A, the I/O throughput level is equal to or higher than 10% from 0 o'clock to 7 o'clock, but the I/O throughput level rapidly increases from 7 o'clock to 10 o'clock, and is 100% from 10 o'clock to 19 o'clock. Thereafter, the I/O throughput level rapidly decreases until 22 o'clock, and becomes 15% at 22 o'clock. Thereafter, the I/O throughput level gradually decreases until 24 o'clock, and becomes about 0% at 24 o'clock.

In this embodiment, with reference to the disk rotation information of FIG. 5, the rotation number of the disk 11 is set in accordance with the I/O throughput level. Accordingly, the rotation number of the disk 11 is 4,000 rpm from 0 o'clock to 7 o'clock. Thereafter, along with the increase of the I/O throughput level, the rotation number of the disk 11 also increases to 5,280 rpm, then to 6,240 rpm, and then to the steady rotation of 7,200 rpm. Thereafter, the rotation number of the disk 11 decreases to 5,920 rpm, then to 5,280 rpm, then to 4,320 rpm, and then to 4,000 rpm from 19 o'clock to 24 o'clock.

As described above, in a unit period in which the I/O throughput level is closer to 100%, the rotation number of the disk 11 is set to a value closer to the steady rotation number. Consequently, when access from the host device HC has been made, the time necessary until setting of the disk 11 into the steady rotation number is shorten, and thus the processing can be swiftly performed. On the other hand, in a unit period in which the I/O throughput level is closer to 0%, the rotation number of the disk 11 is set lower. This is because, as the access frequency from the host device HC is low, a delay of the processing does not cause a serious problem even if the time necessary until setting of the disk 11 into the steady rotation number is prolonged to some extent.

In this embodiment, when the previous unit period is a non-busy period, the state setting unit 193 saves data, which has been read in the previous unit period, from the previous history information 153b into the buffer 151, and sets the rotation number of the disk 11 to a value suitable for the I/O throughput level. In this state, when a read command is received from the host device HC, and the data indicated by the read command is present in the buffer 151, the access processing unit 194 executes command processing, while the rotation number of the disk 11 is kept unchanged. After completion of the processing, the access processing unit 194 returns a response to the host device HC, and then causes a shift into the active mode. Consequently, an effect is obtained that can swiftly deal with a command from the host device HC, and reduce the power consumption of the disk device 10, even when the disk 11 is not set in the steady rotation number.

Further, as data of the previous unit period is used as estimation information, an effect is also obtained that can make a response to the host device HC earlier, while suppressing the power consumption, when similar access is repeatedly given over certain measurement object periods.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a first buffer that stores data stored on a basis of history information concerning read access;
a second buffer having a capacity capable of storing data based on past statistical information concerning write access;
a disk medium that rotates in a first rotation state when access is given, and rotates in a second rotation state lower in rotation number than the first rotation state when access is not given; and
a controller that controls data transfer between the first buffer and the disk medium and between the second buffer and the disk medium,
wherein the controller
performs setting with respect to the first buffer, the second buffer, and the disk medium, on a basis of the history information, which contains a state of the access and an I/O throughput level in each unit period, the I/O throughput level being a ratio of an access data amount to a storage capacity of the first buffer and the second buffer,
receives, from a host device, a read command for reading first data stored in the first buffer, when the disk medium is in the second rotation state,
transmits the first data from the first buffer to the host device, without causing a shift into the first rotation state, and then shifts the disk medium into the first rotation state after completion of execution of the read command,
receives, from the host device, a write command for writing second data, when the disk medium is in the second rotation state,
stores the second data into the second buffer, without causing a shift into the first rotation state, and then shifts the disk medium into the first rotation state after completion of execution of the write command, and
writes the second data stored in the second buffer into the disk medium.

2. The disk device according to claim 1, wherein, even in a case where timer setting for a shift from the first rotation state into the second rotation state is not effective, when the I/O throughput level in the history information of a past unit period is lower than 100%, the controller shifts the disk medium into the second rotation state.

3. The disk device according to claim 1, wherein, when the I/O throughput level in the history information of a past unit period is lower than 100%, the controller shifts the disk medium into the second rotation state, in accordance with timer setting for a shift from the first rotation state into the second rotation state.

4. The disk device according to claim 2, wherein the second rotation state includes a plurality of rotation states depending on the I/O throughput level.

5. The disk device according to claim 1, wherein, in a unit period in which the I/O throughput level is lower than 100%, the controller executes examination processing to a data recording state on the disk medium.

6. The disk device according to claim 1, wherein, in a unit period in which the I/O throughput level is equal to or higher than 100%, when start setting is present for examination processing to a data recording state on the disk medium, the controller does not execute the examination processing.

7. The disk device according to claim 1, wherein
the unit period in the history information is one hour, and
the history information is held in an amount corresponding to one day.

8. The disk device according to claim 1, wherein
the unit period in the history information is one hour, and
the history information is held in an amount corresponding to one week.

9. A disk device control method, for a disk device including
a first buffer that stores data stored on a basis of history information concerning read access,
a second buffer having a capacity capable of storing data based on past statistical information concerning write access;
a disk medium that rotates in a first rotation state when access is given, and rotates in a second rotation state lower in rotation number than the first rotation state when access is not given, and
a controller that controls data transfer between the first buffer and the disk medium and between the second buffer and the disk medium,
the method comprising:
performing setting with respect to the first buffer, the second buffer, and the disk medium, on a basis of the history information, which contains a state of the access and an I/O throughput level in each unit period, the I/O throughput level being a ratio of an access data amount to a storage capacity of the first buffer and the second buffer;
receiving, from a host device, a read command for reading first data stored in the first buffer, when the disk medium is in the second rotation state;
transmitting the first data from the first buffer to the host device, without causing a shift into the first rotation state, and then shifting the disk medium into the first rotation state after completion of execution of the read command
receiving, from the host device, a write command for writing second data, when the disk medium is in the second rotation state;
storing the second data into the second buffer, without causing a shift into the first rotation state, and then shifting the disk medium into the first rotation state after completion of execution of the write command; and writing the second data stored in the second buffer into the disk medium.

10. The disk device control method according to claim 8, wherein, in the performing of the setting, even in a case where timer setting for a shift from the first rotation state into the second rotation state is not effective, when the I/O throughput level in the history information of a past unit period is lower than 100%, the disk medium is shifted into the second rotation state.

11. The disk device control method according to claim 8, wherein, in the performing of the setting, when the I/O throughput level in the history information of a past unit period is lower than 100%, the disk medium is shifted into the second rotation state, in accordance with timer setting for a shift from the first rotation state into the second rotation state.

12. The disk device control method according to claim 10, wherein the second rotation state includes a plurality of rotation states depending on the I/O throughput level.

13. The disk device control method according to claim 8, further comprising:

executing, in a unit period in which the I/O throughput level is lower than 100%, examination processing to a data recording state on the disk medium.

14. The disk device control method according to claim 8, wherein, in a unit period in which the I/O throughput level is equal to or higher than 100%, when start setting is present for examination processing to a data recording state on the disk medium, the method does not execute the examination processing.

15. The disk device control method according to claim 8, wherein the unit period in the history information is one hour, and the history information is held in an amount corresponding to one day.

16. The disk device control method according to claim 8, wherein the unit period in the history information is one hour, and the history information is held in an amount corresponding to one week.

\* \* \* \* \*